Oct. 4, 1960 H. L. GIWOSKY 2,954,623
SLIDE VIEWER OPERABLE ON BATTERIES OR LINE VOLTAGE
Filed Oct. 11, 1956 3 Sheets-Sheet 1

INVENTOR.
HARRY L. GIWOSKY
BY
ATTORNEY

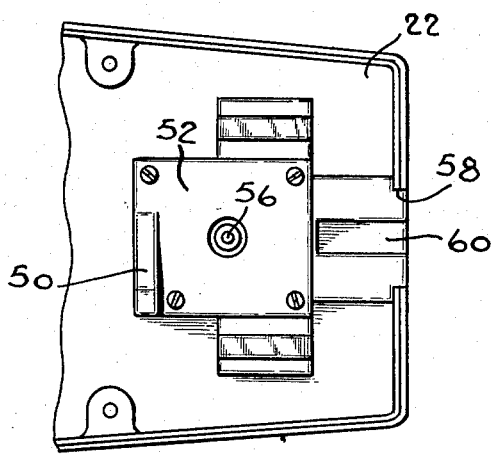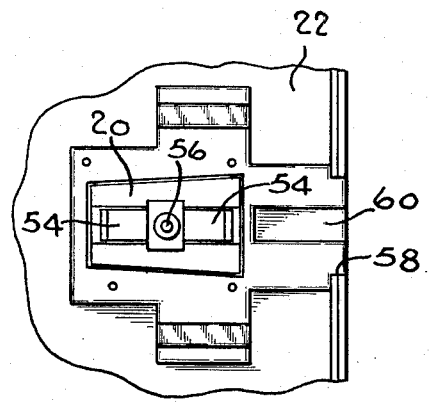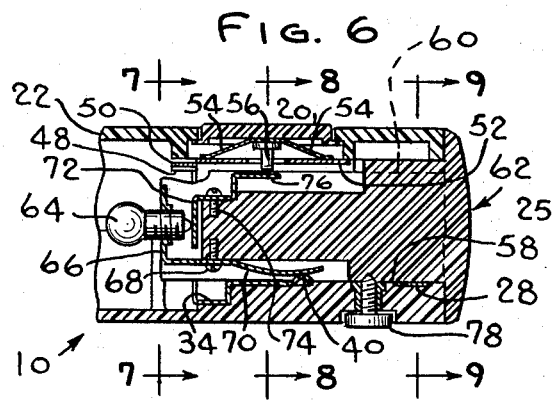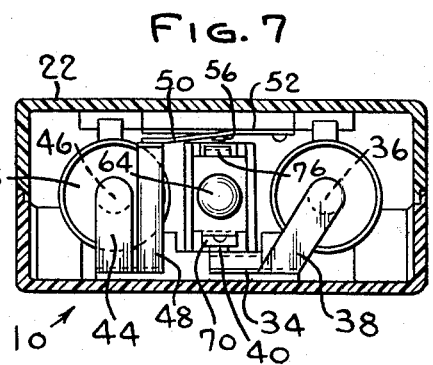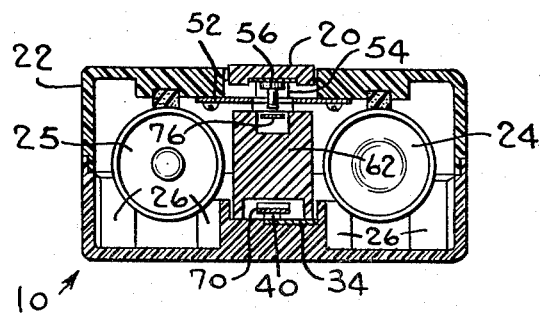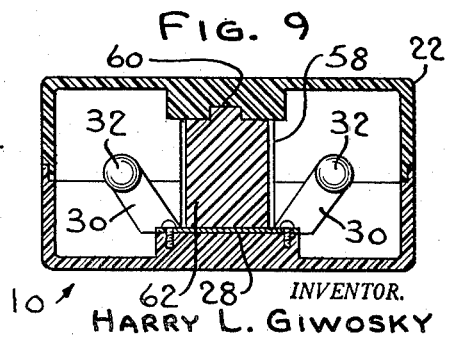

Oct. 4, 1960 H. L. GIWOSKY 2,954,623
SLIDE VIEWER OPERABLE ON BATTERIES OR LINE VOLTAGE
Filed Oct. 11, 1956 3 Sheets-Sheet 3

INVENTOR.
HARRY L. GIWOSKY
BY
John W. Michael
ATTORNEY

United States Patent Office 2,954,623
Patented Oct. 4, 1960

2,954,623

SLIDE VIEWER OPERABLE ON BATTERIES OR LINE VOLTAGE

Harry L. Giwosky, Bay Side, Wis., assignor, by mesne assignments, to Realist, Inc., Menomonee Falls, Wis., a corporation of Delaware Filed Oct. 11, 1956, Ser. No. 615,415

12 Claims. (Cl. 40—63)

This invention relates to a slide viewer and has as its principal object the provision of a slide viewer which is readily and easily converted from battery to line voltage operation.

A further object is to provide a slide viewer in which the light output may be varied (when operating on line voltage) by means of a rheostat which is taken out of the viewer when the viewer is operated on batteries.

Still another object is to provide a slide viewer which can be operated by batteries or line voltage and which does not require removal of the batteries when operating on line voltage.

A further object is to provide a viewer of the type described in which the bulb filament is placed in the optimum position whether operating on battery or line voltage.

Still another object is to provide a viewer in which the bulb may be replaced easily without removing the cover of the viewer.

In carrying out the above objects, I provide a slide viewer in which the batteries make connection with an internal circuit adapted to be completed upon depression of a manually operable switch located above a cavity in the housing into which a cartridge-like member may be inserted. This cartridge-like member carries the bulb of the proper voltage rating to operate with the batteries and makes connection with the internal wiring within the viewer housing. The member additionally includes a switch element which cooperates with the switch on the housing to complete the circuit through the batteries and the bulb when the switch is depressed. To convert the viewer to operation on 110 volts (A.C. or D.C.), the cartridge-like member is removed and a different cartridge is inserted into the cavity. This second cartridge does not have any electrical connection with the battery circuit but is provided with a line cord for plugging in the wall outlet and includes the necessary switch element as well as a bulb for operation at the line voltage. The cartridge is also provided with a rheostatic control to vary the light output of the bulb and this compensates for over or under exposure of the transparencies being viewed. Thus the bulb is actually an 80 volt bulb which when operating at 110 volts will emit a brighter and bluer light than it will at 80 volts. The rheostat can also be adjusted to drop the voltage below 80 to decrease the light output and also shift the color temperature towards the warmer colors. This is a desirable feature.

It will be seen that the present viewer can readily be converted from battery to line voltage operation and does not require removal of the batteries and installation of the rheostat and so on within the housing. This is a marked advantage over those viewers which require the users to practically rebuild the interior of the viewer in order to convert from one type of operation to the other.

Other objects and advantages will be pointed out in, or be apparent from the specification and claims, as will obvious modifications of the embodiment shown in the drawings, in which:

Figure 4 is a fragmentary view of the underside of the housing cover;

Figure 5 is a fragment of Figure 4 with the cover plate over the switch assembly removed;

Figure 6 is a vertical section through the battery cartridge mounted in the housing to show the manner in which the switch may close the circuit;

Figure 7 is a section taken as indicated by line 7—7 on Figure 6;

Figure 8 is a section taken as indicated by line 8—8 on Figure 6;

Figure 9 is a section taken as indicated by line 9—9 on Figure 6;

Figure 1:
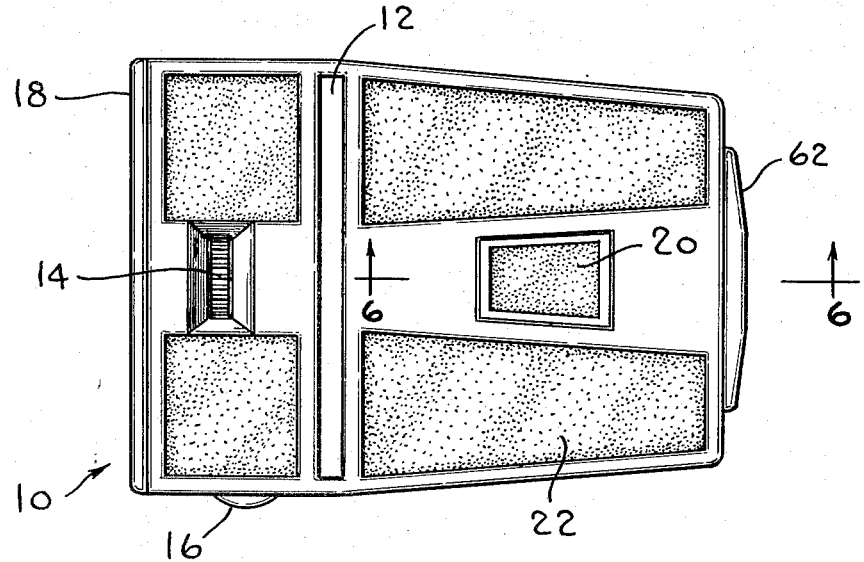
Figure 1 is a plan view of the viewer.
Figures 2, 3:
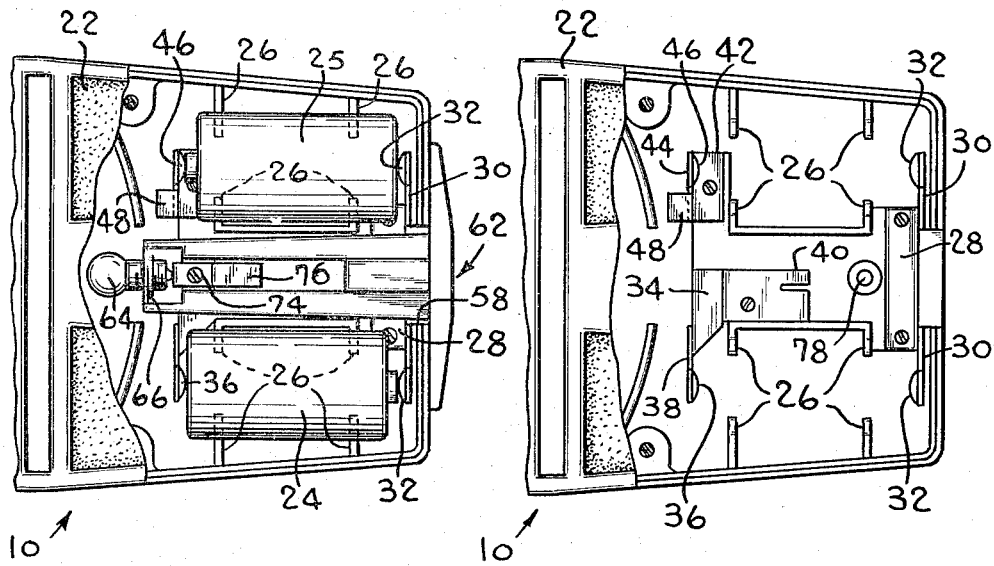
Figure 2 is an enlarged plan view with parts broken away to show the batteries placed within the housing and also showing the low voltage or battery cartridge mounted in place.
Figure 3 is similar to Figure 2 but the batteries and the cartridge have been removed.
Figure 10:
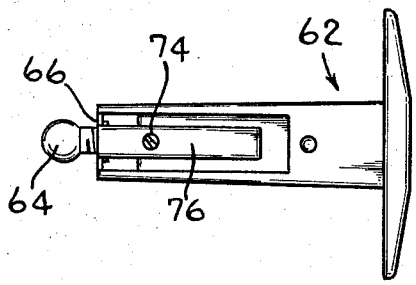
Figure 10 is a top plan view of the low voltage or battery cartridge per se.
Figure 11:
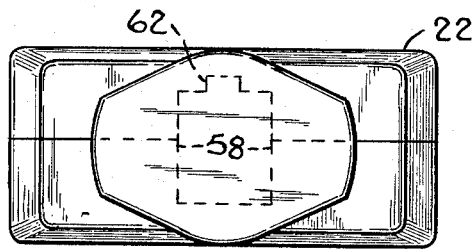
Figure 11 is a rear view of the battery cartridge mounted in the viewer.
Figures 12, 13:
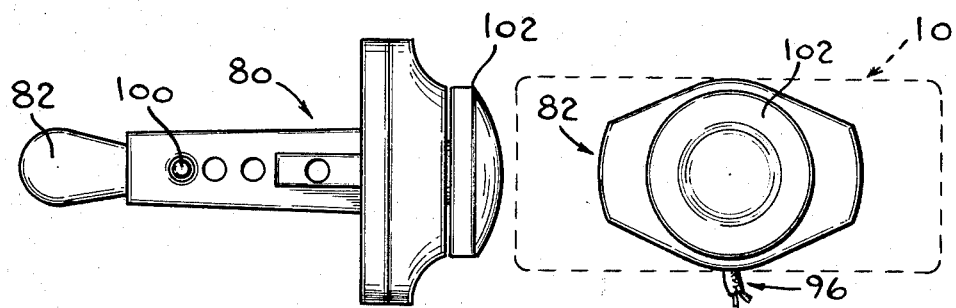
Figure 12 is a top plan view of the high voltage (or line voltage) cartridge.
Figure 13 is a rear view of the cartridge shown in Figure 12 with the viewer shown in dotted lines.
Figures 14, 15:
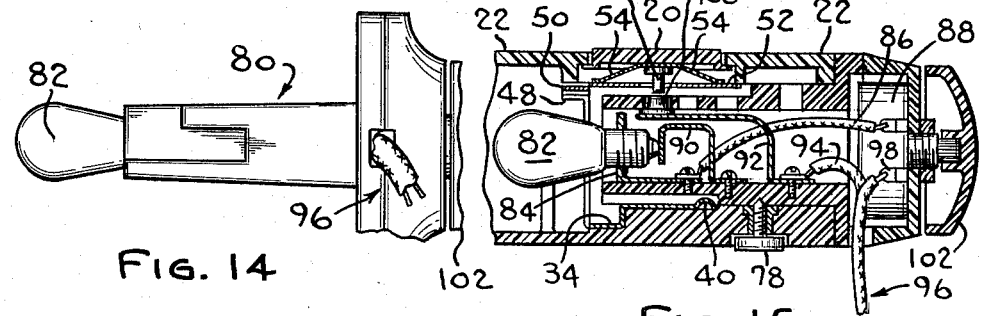
Figure 14 is a bottom view of the line voltage cartridge.
Figure 15 is a vertical section showing the line voltage cartridge mounted in the viewer.

Now referring to the drawings in detail, it should be mentioned that the invention is not limited to application to stereo slide viewers even though the drawings illustrate that type of viewer. It is believed to be evident from the nature of the invention that it is equally applicable to conventional slide viewers. The viewer 10 is provided with a slide aperture 12, an interocular adjustment 14, focus adjustment 16 and a pair of viewing lenses (not shown) mounted in front panel 18. The viewer is, of course, dependent upon internal illumination which is turned on when switch pad or actuator 20 is depressed. Underneath cover 22 of the viewer batteries 24, 25 are positioned in the cradles 26 formed within the viewer housing to connect the batteries in series. The wiring and connections of the batteries in series is effected by means of three metal plates mounted in the housing. At the rear of the housing is positioned a plate 28 which is adapted to connect to the top of battery 24 and to the bottom of battery 25, as may be seen by reference to Figures 2, 3 and 9. In Figure 9 the upstanding arms 30 provided with the contactors 32 may be seen. In Figures 2 and 3 can be seen another plate 34 which is adapted to contact the bottom of battery 24 through contact 36 carried on the upstanding arm 38 (see Figure 7). Plate 34 is also provided with a raised finger or boss 40 (Figures 3 and 6) which is adapted to make contact with the low voltage cartridge as will be explained more fully hereinafter.

The third wiring plate 42 is provided with an upstanding arm 44 carrying contact 46 to connect with the top of battery 25 and is also provided with an upwardly projecting arm 48, the top of which is bent over and is adapted to make contact with tab 50 depending from metal plate 52 mounted on the underside of the housing cover 22. Plate 52 is in electrical contact with metal spring 54 which bears down on the upper surface of plate 52 to bias insulated switch pad 20 upwardly to pull switch pin 56 upwardly out of contact with the switch element carried by the low voltage cartridge as explained hereinafter.

Figure 16:
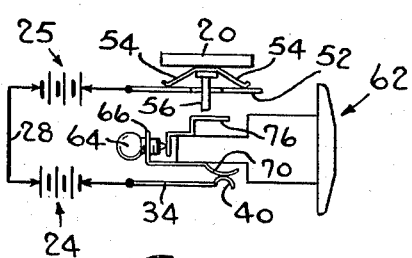
Figure 16 is a schematic showing of the battery operation.

At the rear of the viewer housing is a generally rectangular opening 58, having a key way 60 at the top of the opening. The low voltage or line voltage cartridges are adapted to be inserted into the housing through this opening. The low voltage cartridge 62 carries the usual six volt bulb 64 which is screwed into plate 66 fixed on the cartridge 62 by screw 68 and which is formed around on the underside of the cartridge 62 and provided with a resilient finger 70 which is adapted to contact boss 40 integral with plate 34 as described above. The base of bulb 64 makes contact with stepped plate 72 secured to the cartridge by screw 74 and terminating in a portion 76 underlying switch pin 56. Since the springs 54 bias switch plate 20 and switch pin 56 upwardly, the pin normally does not contact plate 76 and thus there is no electric circuit through the bulb. When the switch pad is depressed, pin 56 will contact plate 76 and complete the circuit through the battery and bulb. This is readily understood from Figure 16 which shows the wiring arrangement schematically.

It will be noted that the upward movement of the switch pad 20 is limited by a peripheral flange on the pad which engages the underside of the opening in the housing in which the switch pad is located (see Figure 6). It is also to be noted that the low voltage cartridge 62 is retained in the housing as a more or less integral part thereof by means of set screw 78 in the bottom of the housing. When this screw is backed off it no longer engages the low voltage cartridge and the low voltage cartridge can be easily withdrawn. This, incidentally, is a nice feature in cases where the bulb is burned out and must be replaced, saving the bother of taking the cover plate off the housing.

Figure 17:
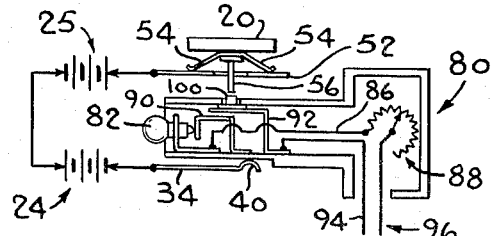
Figure 17 is a schematic showing of the line voltage arrangement.

After the low voltage cartridge has been removed, the high voltage cartridge may be substituted in its place to convert the viewer to line voltage operation. The high voltage cartridge 80 is provided with an 80 volt bulb 82 which is mounted in the angle plate 84 fixed on the interior of the cartridge and having lead 86 from rheostat 88 connected thereto. The base of bulb 82 contacts bracket 90 within the cartridge and bracket 90 is adapted to be contacted by resilient strip 92 when the strip is depressed as pointed out more fully hereinafter. Strip 92 has one lead 94 of line cord 96 connected thereto. The other lead of the line cord is connected to rheostat 88 at terminal 98. It will be noted that the cartridge 80 is retained within the housing by set screw 78. It will also be noted that the underside of the cartridge insulates the cartridge from the battery circuit and thus there is no way to complete the circuit through the battery. Now then, when the switch pad 20 is depressed switch pin 56 will strike insulated boss 100 carried on the outer extremity of strip 92 to depress the strip into contact with plate 90 and thus complete the circuit through the rheostat and bulb 82. The rheostat is provided with control knob 102 which may be rotated to vary the voltage across bulb 82 and thus vary the light intensity and the color temperature thereof. The wiring arrangement for the line voltage operation is schematically shown in Figure 17, and is readily understandable by reference thereto.

From this description it will be readily apparent that this viewer can be rapidly converted from battery to line voltage operation and vice versa. Also, this arrangement makes it extremely simple to exchange a new bulb for a burned out bulb. It will be noted that in either case, the bulb is positioned to project through the aperture 104 in the curved white reflector 106, so that the transparencies are illuminated by reflected light. In both cases, the bulb is positioned in the optimum position having due regard for the difference in size of the bulb. This is not true in other projectors which provide a fixed location for the bulb whether operating on battery or line voltage. It will be appreciated that it is a simple matter to vary the length of the cartridge to accurately position the bulb filament in the present viewer.

Although but one embodiment of the present invention has been illustrated and described, it will be apparent to those skilled in the art that various changes and modifications may be made therein without departing from the spirit of the invention or from the scope of the appended claims.

What I claim is:

1. A slide viewer having a housing provided with a lens and adapted to receive a slide transparency for viewing through the lens, a battery mounted in the housing, a switch actuator mounted in the housing, a portion of an electric circuit in the housing and including the battery, a cavity in the housing, a cartridge-like member projecting through an opening in the housing and removably mounted in the cavity with one portion of said cartridge-like member closing said opening and having mounted thereon switch means and a light bulb, and said cartridge-like member including another electric circuit portion including the bulb and said switch means, said member upon being positioned in the cavity placing said switch means in position for actuation by the switch actuator whereby actuation of the actuator will operate to close a circuit through the bulb to illuminate the slide.

2. A slide viewer according to claim 1 in which said switch means includes a complete switch adapted to be actuated by the actuator and said another circuit portion on said member is independent of the battery circuit and terminates in a line cord.

3. A slide viewer according to claim 2 wherein the battery and the switch actuator and the portion of the electric circuit in the housing are arranged and disposed with respect to the cavity so that said cartridge-like member may be replaced by another member which is provided with another switch means, a light bulb and a circuit portion including said another switch means and the bulb and which cooperates with the circuit portion in the housing to close a circuit through the bulb and battery when the actuator is actuated.

4. A slide viewer according to claim 1 including a rheostat mounted on the member and a line cord for connection to an external source of electric power in circuit with the bulb and rheostat to vary the voltage across the bulb.

5. A slide viewer having a housing provided with a lens and adapted to receive a slide transparency for viewing thru the lens, a battery mounted in the housing, an opening in the wall of the housing, a switch actuator mounted in the housing adjacent the opening and including a switch element, a portion of an electric circuit in the housing and including the battery and the switch element, a cartridge-like member removably mounted in the opening in the housing with one portion of said cartridge-like member closing said opening, a light bulb carried by the member, a second switch element carried by the member and positioned for operation by the actuator, and a portion of an electric circuit carried by the member and including the second switch element and the bulb and adapted for connection to a voltage source whereby actuation of the actuator will cause the bulb to be illuminated.

6. A slide viewer according to claim 4 in which the circuit portion of the member is insulated from the housing circuit portion and includes a line cord for connection to an external power source.

7. A slide viewer having a housing provided with a lens and adapted to receive a slide transparency for viewing through the lens, a battery mounted in said housing, a switch actuator mounted in said housing, a first switch contact mounted in said housing, a cavity in said housing, electrical circuitry in said housing including said battery and said first switch contact, and a pair of interchangeable members insertable in said cavity, one of same members having a light bulb and a second switch contact mounted therein and having electrical circuitry mounted therein including said light bulb and said second switch contact cooperating with said electrical circuitry in said housing when the member is inserted in said cavity to close said first and second switch contacts when said actuator is actuated to thereby illuminate said light bulb by means of said battery, said second member having a second light bulb and a switch mounted therein and having electrical circuitry mounted therein terminating in a line cord for connection to an external power source including said second light bulb and switch, said member including means for insulating said electrical circuitry in said second member from said electrical circuitry in said housing when said second member is inserted in said cavity and with said switch actuator cooperating with said switch to illuminate said second light bulb by means of said external power source when said actuator is actuated.

8. A viewer according to claim 7 in which a rheostat is mounted on said second member and is connected in circuit with the line cord and is included in the electrical circuitry of the second member for varying the voltage supplied to the light bulb from said external power source.

9. A slide viewer having a housing provided with a lens and adapted to receive a slide transparency for viewing through the lens, a battery mounted in the housing, a switch actuator mounted in the housing, a portion of an electric circuit in the housing and including the battery, a cavity in the housing, a cartridge-like member projecting through an opening in the housing and removably mounted in the cavity and having mounted thereon switch means and a light bulb and also including another electric circuit portion including the bulb and said switch means, said member being positioned in the cavity to place said switch means for actuation by the switch actuator so that actuation of the actuator operates to complete a circuit through the bulb and battery whereby the slide is illuminated.

10. A slide viewer having a housing provided with a lens and adapted to receive a slide transparency for viewing through the lens, a battery mounted in the housing, an opening in the wall of the housing, a switch actuator mounted in the housing adjacent the opening and including a switch element, a portion of an electric circuit in the housing and including the battery and the switch element, a cartridge-like member removably mounted in the opening in the housing, a light bulb carried by the member, a second switch element carried by the member and positioned for operation by the actuator, and a portion of an electric circuit carried by the member and including the second switch element and the bulb with the housing circuit terminating adjacent the member and the member circuit portion being in electrical contact therewith whereby the battery supplies the operating voltage to the bulb.

11. A slide viewer having a housing provided with a lens and adapted to receive a slide transparency for viewing through the lens, a battery mounted in the housing and accessible from the exterior of the housing, a manually activated circuit closing means mounted in the housing, a portion of an electrical circuit in the housing and including the battery, a cavity in the housing, a cartridge-like member projecting through an opening in the housing and removably mounted in the cavity, said cartridge-like member having a light bulb mounted thereon and another electric circuit portion including said light bulb, said manually actuated circuit closing means adapted upon actuation when said member is mounted in said cavity to complete a circuit through said battery and bulb to illuminate a slide.

12. A slide viewer having a housing provided with a lens and adapted to receive a slide transparency for viewing through the lens, a switch actuator mounted in the housing, a cavity in the housing, a cartridge-like member projecting through an opening in the housing and removably mounted in the cavity, said cartridge-like member having a light bulb mounted thereon and an electric circuit including said bulb, said electric circuit terminating in a line cord, a rheostat mounted on said cartridge-like member in circuit with said bulb to vary the voltage across said bulb, and control means for said rheostat accessible from outside said housing when said cartridge-like member has been mounted in said cavity, said actuator adapted upon actuation when said member is mounted in said cavity to complete a circuit through said cord and bulb to illuminate a slide.

References Cited in the file of this patent

UNITED STATES PATENTS 2,787,191     Horton et al. _____ Apr. 2, 1957

FOREIGN PATENTS 1,115,285     France _____ Apr. 23, 1956

UNITED STATES PATENT OFFICE
CERTIFICATE OF CORRECTION

Patent No. 2,954,623 October 4, 1960

Harry L. Giwosky

It is hereby certified that error appears in the printed specification of the above numbered patent requiring correction and that the said Letters Patent should read as corrected below.

Column 4, line 65, for the claim reference numeral "4" read -- 5 --; column 6, line 13, strike out "and accessible from the exterior of the housing" and insert the same after "ing" and before the comma, in line 15, same column.

Signed and sealed this 11th day of April 1961.

(SEAL)
Attest:
ERNEST W. SWIDER
Attesting Officer

ARTHUR W. CROCKER
Acting Commissioner of Patents